(12) United States Patent  
Jones

(10) Patent No.: US 11,730,207 B2  
(45) Date of Patent: Aug. 22, 2023

(54) SLOUGHING SKIN SOCK

(71) Applicant: Susan Jones, Franklin, TN (US)

(72) Inventor: Susan Jones, Franklin, TN (US)

(*) Notice: Subject to any disclaimer, the term of this patent is extended or adjusted under 35 U.S.C. 154(b) by 456 days.

(21) Appl. No.: 16/801,957

(22) Filed: Feb. 26, 2020

(65) Prior Publication Data

US 2021/0259328 A1 Aug. 26, 2021

(51) Int. Cl.
*A41B 11/00* (2006.01)
*B32B 27/08* (2006.01)

(52) U.S. Cl.
CPC ............ *A41B 11/005* (2013.01); *B32B 27/08* (2013.01); *B32B 2307/73* (2013.01); *B32B 2317/10* (2013.01); *B32B 2437/00* (2013.01)

(58) Field of Classification Search
CPC ... A41B 11/005; B32B 27/08; B32B 2317/10; B32B 2307/73; B32B 2437/00
See application file for complete search history.

(56) References Cited

U.S. PATENT DOCUMENTS

| | | | | |
|---|---|---|---|---|
| 4,467,626 A | * | 8/1984 | Coble | A41B 11/02 66/196 |
| 4,615,188 A | * | 10/1986 | Hursh | A41B 11/02 66/196 |
| 2019/0387812 A1 | * | 12/2019 | Chaney | B32B 5/024 |

* cited by examiner

*Primary Examiner* — Cephia D Toomer
(74) *Attorney, Agent, or Firm* — Francis Law Firm, PLLC; James M. Francis

(57) ABSTRACT

The present disclosure is a sock that has a leg that extends up a person's calf and a foot integral with the leg that cover's the person's foot. The sock further has a footie coupled to the foot, coupled partially up the sides of the foot, coupled partially to the heel turn, and coupled around the toes, the footie comprising a coarse material and configured to receive water such that when the sock is worn, the coarse material sloughs off dry skin, dead skin, callouses and removes toxins from the person's feet.

17 Claims, 2 Drawing Sheets

SLOUGHING SKIN SOCK

BACKGROUND

As a person walks on their feet, the bottoms of their feet may develop dry skin, dead skin, and/or callouses. In addition, the persons feet may collect environmental toxins from the person's daily habits, for example. In this regard, the bottoms of the person's feet have fewer oil glands than other parts of the person's body. Without as many oil glands, it is difficult for the person's feet to not develop dry skin, dead skin, callouses and release toxins.

Further, the bottom of the person's feet experiences daily wear and tear. Considering the daily wear and tear, dry skin, dead skin, and callouses often appear on the heels of the person's feet or on the balls of the person's feet. Further, the daily habits of the person may result in a build up of toxins in the person's feet.

Typically, the person uses foot soaks, moisturizers, and regular exfoliation. These practices tend to aid in the removal of the dry skin, the dead skin, callouses and toxins that form or collect on the bottom of the person's feet. However, these practices tend to be onerous.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
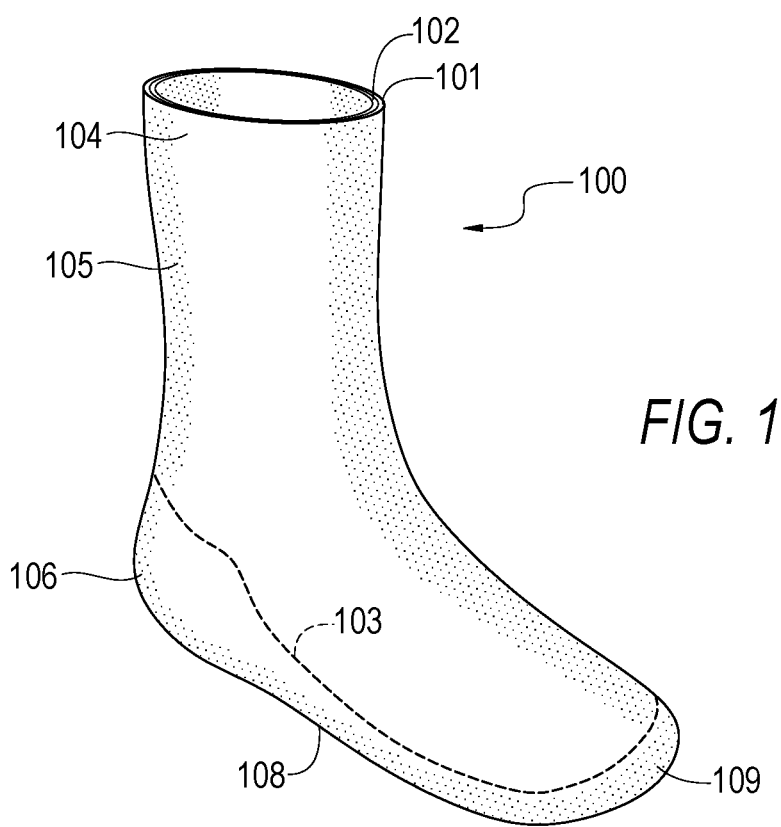
FIG. 1 is a perspective view of a sloughing skin sock in accordance with an embodiment of the present disclosure.

The present disclosure describes an exemplary sloughing skin sock in accordance with an embodiment of the present disclosure. The sloughing skin sock comprises a leg having an opening therein at the top of the leg for inserting a person's foot when putting on the sloughing skin sock. In one embodiment, the sloughing skin sock may comprise a cuff at the top of the leg that encircles a person's leg. However, other embodiments of the sloughing skin sock do not have a cuff.

The leg gradually integrates with a foot of the sloughing skin sock that is designed for receiving the person's foot. The foot of the sloughing skin sock encircles the person's foot such that there is a top portion of the foot and an underside portion of the foot, sometimes referred to as an instep of the foot. The sloughing skin sock further covers the person's heel, which is often referred to a heel turn. Further, the sloughing skin sock comprises a cup-like toe integral with the foot for receiving the person's toes.\

The entire sloughing skin sock comprises two layers. The sloughing skin sock comprises an outward layer. The outward layer is made of a rubber-like material that is waterproof. For example, the rubber-like material may be nitrile.

Nitrile rubber, also known as NBR, Buna-N, and acrylonitrile butadiene rubber, is a synthetic rubber copolymer of acrylonitrile (ACN) and butadiene. Trade names of nitrile include Perbunan®, Nipol®, Krynac® and Europrene®. Nitrile butadiene rubber (NBR) is a family of unsaturated copolymers of 2-propenenitrile and various butadiene monomers (1,2-butadiene and 1,3-butadiene). Although its physical and chemical properties vary depending on the polymer's composition of nitrile, this form of synthetic rubber is unusual in being generally resistant to water, oil, fuel, and other chemicals (the more nitrile within the polymer, the higher the resistance to oils but the lower the flexibility of the material). Thus, in one embodiment, there is less nitrile in the outward layer to ensure flexibility of the sloughing skin sock. Nitrile rubber is also puncture resistant and exhibits dexterous strength.

Note that the outward layer may not be nitrile. The outward layer could be, for example, polychloroprene or polyurethane. In one embodiment, the outward layer is not made of a natural rubber due to the prevalence of natural rubber allergies.

The sloughing skin sock further comprises an inner layer. In one embodiment, the inner layer is composed of a soft material. For example, the inner layer may be comprised of a soft cotton material. It may be any type of cotton material known in the art or future developed. As mere examples, the sloughing skin sock may be made of Pima cotton, Egyptian cotton, or Supima cotton. Notably, the cotton fabric is made from organic fibers from the seeds of the cotton plant. It is by its nature very breathable, has high moisture-wicking abilities, medium heat retention abilities, and medium stretchability. Note that in one embodiment, synthetic cotton may be used as the inner layer. That is, the inner layer may be produced entirely from chemicals. For example, the inner layer may be comprised of synthetic, man-made polyester, rayon, acrylic, etc.

As described above, the entire sloughing skin sock comprises the outward layer and the inner layer throughout the entire sock. In this regard, the outward layer and the inner layer extend from the cuff of the sock, down the leg of the sock, over a heal turn, on the bottom and on the top of the foot and the toe. The outward and inner layers are throughout the entire sloughing skin sock.

The sloughing skin sock further comprises an innermost layer; however, this layer it not throughout the entire sock. The innermost layer is coupled to the inner layer made of the cotton material, for example. The innermost layer may be sewn into the heel curve, the underside of the foot, and around the toes. In another embodiment, in innermost layer may be adhered to the inner layer via an epoxy. Other types of methods may be used to couple the innermost layer to the heel curve, the foot, up the sides of the foot, and around the toes.

In one embodiment, the innermost layer is made of a rough, porous material capable of retaining water. For example, the innermost layer may be made of a coarse nylon or crepe material. Note that these are mere examples, and other materials may be used in other embodiments.

In use, a person pours water down through the open cuff and down the left portion of the sloughing skin sock. The water rests in and is retained by the innermost layer of the sloughing skin sock. The water does not seep out from the sock because of the nitrile outward layer that is waterproof. The person walks about his/her home or other place, as desired, wearing the socks. As the person walks, the walking causes friction between the rough, porous material, and the heel, the bottom of the foot, the sides of the foot and around the toes, thereby removing dry skin, dead skin, callouses and toxins from the person's feet.

FIG. 1 is a perspective view of a sloughing skin sock 100 in accordance with an embodiment of the present disclosure. The sloughing skin sock 100 comprises a cuff 104 that is at the top of the sloughing skin sock 100 and encircles the calf (not shown) of a person's leg (not shown). Below the cuff 104 is a leg 105 that is integral with a cuff 104 of the sloughing skin sock 100. The leg portion of the sloughing skin sock 100 extends down to a heal turn 106 that coverts the person's heel (not shown). The bottom of the sloughing skin sock 100 is a foot 108 that encircles the person's foot. Further, the foot 1008 terminates with a toe portion that covers the person's toes.

The cuff 104, the leg 105, the foot 108, and the toe 109 of the sloughing skin sock 100 are comprised of two integral layers. In this regard, the sloughing skin sock 100 comprises an outward layer 101. The outward layer 101 is made of a rubber-type, waterproof material, as described hereinabove. In one embodiment, the outward layer 101 is made of nitrile. As discussed, nitrile is a synthetic rubber polymer of crylonitrile and butadiene.

Note that the outward layer 101 may not be nitrile. The outward layer 101 could be, for example, polychloroprene or polyurethane. In one embodiment, the outward layer is not made of a natural rubber due to the prevalence of natural rubber allergies.

The cuff 104, the leg 105, the heel turn 106, the foot 108, and the toe 109 also comprise an inner layer 102. The inner layer 102 can be made of any type of soft material. In one embodiment, the inner layer 102 is comprised of a soft cotton, as described hereinabove. However, other types of materials may be used in other embodiments. For example, the inner layer 102 may be comprised of a polyester or nylon material.

In one embodiment, the inner layer 102 is coupled to the rubber-like outward layer 101. The inner layer 102 may be sewn to the outward layer 101 in one embodiment. In another embodiment, the inner layer 102 may be adhered to the outward layer 101 via an epoxy or other type of glue material.

Note that the entire sloughing skin sock 100 has an outward layer 101 and an inner layer 102. However, the bottom of the foot 108, over and around the toe 109, up the sides of the foot 108 and a portion of the heel turn 106 also comprises an innermost layer 103. The innermost layer 103 is shaped like a slip-on sock in that the innermost layer 103 cover the underside of the foot 108, the toes 109, up the sides of the foot 108, and up the heel turn 106. The innermost layer 103 may be sewn to the inner layer 102 or it may be adhered to the inner layer 102 via an epoxy.

The innermost layer 103 is comprised of a coarse fabric. In one embodiment, the coarse fabric may be porous material. In this regard, it is a material that can cause friction when worn on a person's feet and it is retains moisture or water. In one embodiment, the innermost layer 103 is comprised of a coarse nylon; however, other types of materials may be used in other embodiments.

In use, a person (not shown) pours water (not shown) through the cuff 104. The water flows down the inside of the leg 105 and rests in the innermost layer 103. The person puts the sloughing skin sock 100 so that his/her foot is in the foot of the sloughing skin sock 100. As the person walks in the sloughing skin sock 100, the coarse innermost layer 103 causes friction between the bottom of the person's foot and the innermost layer 103, thereby sloughing off dry skin, dead skin, calluses and toxins from the person's feet.

Figure 2:
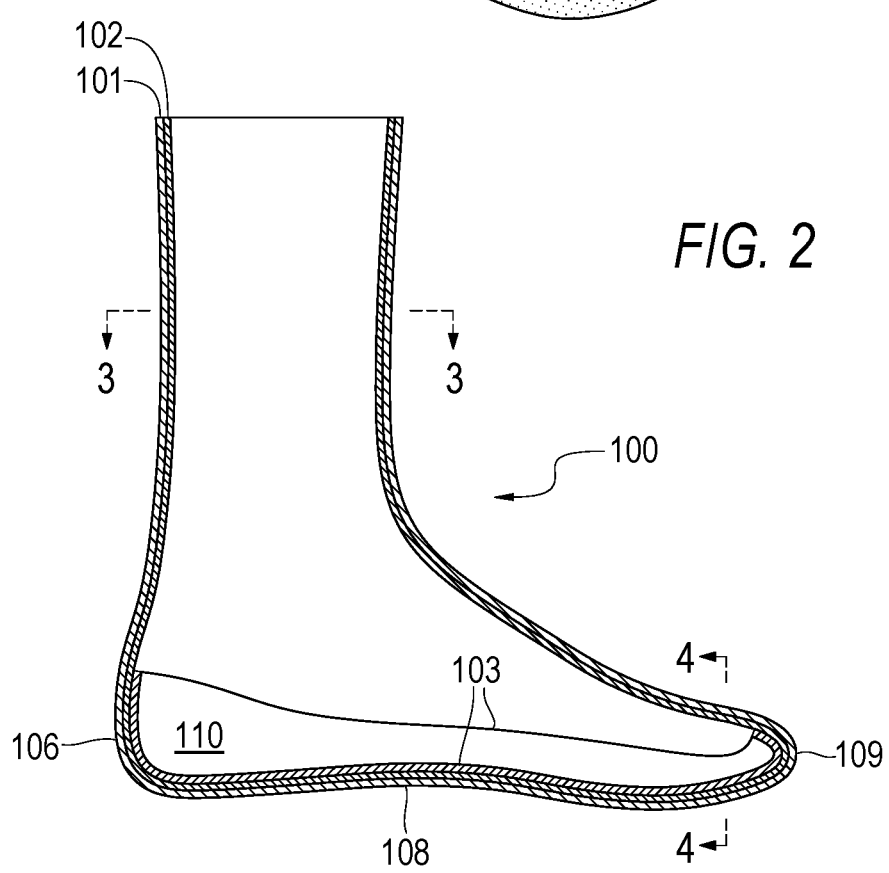
FIG. 2 is a side cross-sectional view of the sloughing skin sock depicted in FIG. 1.

FIG. 2 is a side plan view of the sloughing skin sock 100. The outward layer 101 and the inner layer 102 make up the entire sloughing skin sock 100. In this regard, the outward layer 101 is a rubber-type waterproof material and the inner layer 102 is a soft-type material. The sloughing skin sock 100 also has a third layer, the innermost layer 103.

The innermost layer 103 extends over the bottom of the foot 108, partially up the sides of the foot 108, above and around the toe 109, around the heel turn 106 and partially up the heel turn 106 forming a slip-on footie 110 that is either sewn to the inner layer 102 or adhered to the inner layer 102.

In one embodiment, the footie 110 is a single piece of material. The footie 110 is sewn into the inside bottom of the sloughing skin sock 100 in the foot 108. In another embodiment, the footie 110 may comprise adhesive, and the footie 110 is adhered to the inside bottom of the foot 108 of the sloughing skin sock 100.

Figure 3:
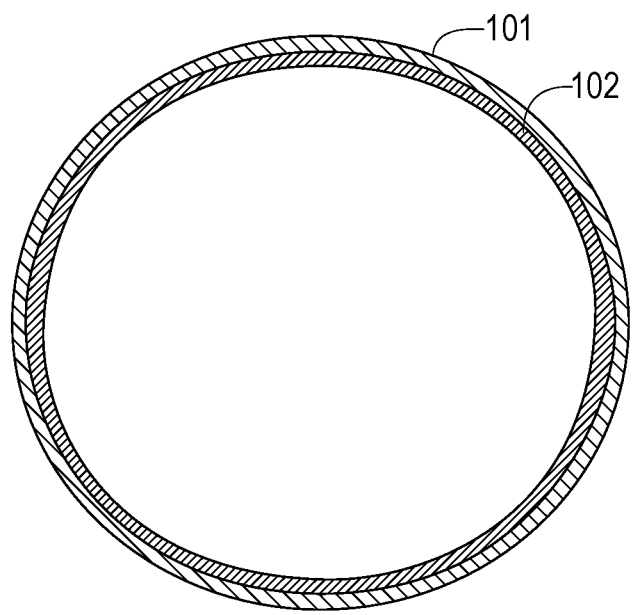
FIG. 3 is a cross-sectional view of the sloughing skin sock taken along line 3-3 in FIG. 1.

FIG. 3 is a cross-sectional view of the sloughing skin sock 100 taken along line 3-3 of FIG. 2. The cross-sectional view is taken across the leg 105. The cross-sectional view shows the outward layer 101. As described above, the outward layer 101 is comprised of a rubber-type material, such as nitrile. Other types of materials may be used in other embodiments.

Further the cross-sectional view taken along line 3-3 of FIG. 2 shows the inner layer 102. The inner layer 102 is comprised of a soft-type material. As an example, the inner layer 102 may be a soft cotton. Other types of materials may be used in other embodiments.

Figure 4:
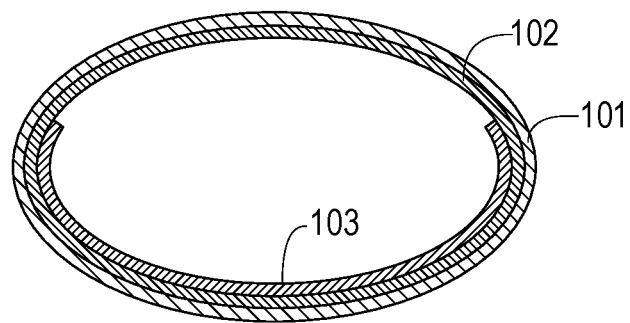
FIG. 4 is a cross-sectional view of the sloughing skin sock taken along line 4-4 in FIG. 1.

FIG. 4 is a cross-sectional view of the sloughing skin sock 100 taken along line 3-3 of FIG. 2. The cross-sectional view is taken through the foot 108. The outward layer 101 is consistently around the foot 108 (FIG. 1). Also, the inner layer 102 is consistently around the foot 108. However, the innermost layer 103 is only on the bottom of the foot 108 and up the sides of the foot 108. The innermost layer 103 comprises the coarse porous material.

A person pours water into the cuff 104 (FIG. 1). The water travels down the leg 105 and rests in the innermost layer 103. The water combined with the friction between the person's foot 108 and the innermost layer 103 sloughs dry skin, dead skin, callouses and toxins from the person's foot (not shown).

The invention claimed is:

1. A sock, comprising:
   a leg that extends up a person's calf;
   a foot integral with the leg that cover's the person's foot; and
   a footie coupled to the foot, coupled partially up the sides of the foot, coupled partially to the heel turn, and coupled around the toes, the footie comprising a coarse material and configured to receive water such that when the sock is worn, the coarse material sloughs off dry skin, dead skin and/or callouses and removes toxins through the person's feet.

2. The sock of claim 1, wherein the leg, the foot, the heel turn and the toe is comprised of two layers of material.

3. The sock of claim 2, wherein the first layer is comprised of a resilient material that is waterproof.

4. The sock of claim 3, wherein the resilient material is nitrile.

5. The sock of claim 3, wherein the resilient material is polychloroprene.

6. The sock of claim 3, wherein the resilient material is polyurethane.

7. The sock of claim 3, wherein the second layer is comprised of a soft typo material.

8. The sock of claim 7, wherein the so soft material is a cotton material.

9. The sock of claim 7, wherein the soft material is polyester.

10. The sock of claim 7, wherein the soft material is nylon.

11. The sock of claim 1, wherein the coarse material is a coarse nylon.

12. The sock of claim 1, wherein the coarse material makes up an innermost layer.

13. The sock of claim 12, wherein the leg, the foot, the heel turn, and the toes are comprised of a first layer and a second layer.

14. The sock of claim 13, wherein the first layer is an outward layer comprised of a resilient waterproof material.

15. The sock of claim 14, wherein the second layer is comprised of a soft cotton.

16. The sock of claim 15, wherein the innermost layer forms the footie.

17. The sock of claim 16, wherein the innermost layer is coarse and can retain water.

* * * * *